United States Patent [19]
Hirata et al.

[11] Patent Number: 5,955,402
[45] Date of Patent: Sep. 21, 1999

[54] BIODEGRADABLE LUBRICATIVE RESIN COMPOSITION

[75] Inventors: Masakazu Hirata, Inabe-gun; Mari Kataoka, Kuwana; Shoji Obuchi; Masanobu Ajioka, both of Yokohama, all of Japan

[73] Assignee: NTN Corporation, Osaka, Japan

[21] Appl. No.: 09/015,212

[22] Filed: Jan. 29, 1998

[30] Foreign Application Priority Data

Jan. 30, 1997 [JP] Japan ................................. 9-016818
Jan. 30, 1997 [JP] Japan ................................. 9-016899

[51] Int. Cl.$^6$ ................. C10M 107/32; C10M 171/04
[52] U.S. Cl. ................. 508/106; 508/107; 508/109; 508/100
[58] Field of Search ................. 508/106, 107, 508/109, 100

[56] References Cited

U.S. PATENT DOCUMENTS

| | | | |
|---|---|---|---|
| 3,779,918 | 12/1973 | Ikeda et al. | 508/106 |
| 3,985,661 | 10/1976 | Ikeda et al. | 508/107 |
| 3,994,814 | 11/1976 | Cairns | 508/106 |
| 4,001,124 | 1/1977 | Hussey | 508/106 |
| 4,448,700 | 5/1984 | Lamkamp | 508/107 |
| 5,236,784 | 8/1993 | Kobayashi et al. | 508/109 |
| 5,427,698 | 6/1995 | Hirokawa et al. | 508/106 |

*Primary Examiner*—Jerry D. Johnson
*Attorney, Agent, or Firm*—Wenderoth, Lind & Ponack, L.L.P.

[57] ABSTRACT

A biodegradable lubricative resin composition which withstands use as a material for sliding parts, and slide bearings and gears made from such a resin composition. The resin composition contains an aliphatic polyester which is a monopolymer or copolymer of a hydroxy-carboxylic acid or an aliphatic polyhydroxy alcohol and an aliphatic polybase, the aliphatic polyester preferably containing 50–100 wt % lactic acid, and a lubricant which is a lubricating oil or a solid lubricant. Slide bearings and gears molded from such a resin composition are also proposed.

13 Claims, No Drawings

BIODEGRADABLE LUBRICATIVE RESIN COMPOSITION

BACKGROUND OF THE INVENTION

This invention relates to a biodegradable, lubricative resin composition, and slide bearings and gears molded of such resin composition.

Today, increasingly greater numbers of slide members such as slide bearings and gears are made of plastics rather than metals because they are required to be as lightweight as possible while maintaining sufficient sliding properties.

Preferable plastics materials for molding such slide members include those having some degree of sliding properties (such as low friction and high wear resistance), such as polyamides and polyacetals.

But such plastic products have a problem in that they do much harm to the environment when buried in the ground or dumped in the sea, because most such plastic wastes do not degrade in the ground or water and thus retain their original shapes practically permanently.

Biodegradable polymers are free of this problem. Known biodegradable polymers include poly($\alpha$-hydroxy acids), which turn to oligomers or monomers by being gradually hydrolyzed in the environment, and poly($\beta$-hydroxy alkanoate), poly($\omega$-hydroxy alkanoate) and polyalkylene alkanoate, which are degraded by enzymatic action in vivo or in vitro. Poly($\alpha$-hydroxy acids) include polylactic acid and polyglycol acid. Poly($\beta$-hydroxy alkanoate) includes a copolymer of hydroxyvaleric acid and hydroxybutyric acid. Polyalkylene alkanoate includes a dehydrated condensate of 1,4-butanediole and succinic acid (i.e. polybutylene succinate). Among these polymers, polylactic acid is biodegraded 100% in vivo in several months to one year, and degrades and disappears in a wet environment such as in the ground or seawater in one to several years' time. It is broken down into lactic acids that are harmless to humans and eventually into carbon dioxide and water.

However, not all of these biodegradable polymers can replace conventional plastics materials. In fact, there is not yet known a biodegradable plastic which does not impair any properties required for conventional engineering plastics used for sliding members.

But to protect the environment, it is required to form as many parts of sliding members from biodegradable resins as possible.

An object of the present invention is to provide a lubricative resin composition which is biodegradable, stably low in friction coefficient and high in wear resistance when used as sliding parts, and to provide slide bearings and gears which are biodegradable and have lubricity.

SUMMARY OF THE INVENTION

According to this invention, there is provided a biodegradable, lubricative resin composition comprising an aliphatic polyester and a lubricant.

The lubricant may be a lubricating oil or a solid lubricant. If a lubricating oil is used, it is preferably a biodegradable one. The solid lubricant is preferably at least one selected from the group consisting of tetrafluoroethylene resin, graphite and mica.

Preferably, the lubricating oil is added by 3–30 volume %, while the solid lubricant is added by 5–30 volume %.

The aliphatic polyester is preferably a monopolymer or copolymer of a hydroxy-carboxylic acid or an aliphatic polyhydroxy alcohol and an aliphatic polybase or mixture thereof; polylactic acid; a copolymer of lactic acid and a hydroxy-carboxylic acid other than lactic acid; a copolymer of lactic acid, an aliphatic polyhydroxy alcohol and an aliphatic polybase; mixture of polylactic acid and a polymer of a hydroxy-carboxylic acid other than lactic acid; or a mixture of polylactic acid and a polymer of an aliphatic polyhydroxy alcohol and an aliphatic polybase. The lactic acid content in the aliphatic polyester is preferably 50–100 wt %.

The biodegradable lubricative resin composition according to the present invention can be molded into such sliding members as slide bearings and gears.

Such biodegradable, lubricative resin composition, and slide bearings and gears made from such resin composition stably maintain low friction coefficients and high wear resistance. When such plastic products are buried in the soil or dumped in the sea after use, the resin composition will quickly degrade due to biodegradable function of its main component(s), i.e. aliphatic polyester and/or lubricating oil, thus minimizing possible damage to the natural habitat.

The aliphatic polyester used in this invention as a main component of the sliding resin composition may be of any type provided it is sufficiently durable in the intended use.

Such aliphatic polyesters include a monopolymer or copolymer of a hydroxy-carboxylic acid or an aliphatic polyhydroxy alcohol and an aliphatic polybase, or mixture thereof.

Particularly preferable biodegradable plastics used in this invention include polylactic acid, a copolymer of lactic acid having a 50 wt % or more lactic acid content and a hydroxy-carboxylic acid other than lactic acid, a copolymer of lactic acid or an aliphatic polyhydroxy alcohol and an aliphatic polybase, a mixture of polylactic acid containing 50 wt % or more lactic acid and a polymer of a hydroxy-carboxylic acid other than lactic acid, and a mixture of polylactic acid and a polymer of an aliphatic polyhydroxy alcohol and an aliphatic polybase.

Such an aliphatic polyester may be one in which part of its molecule chain is extended by a binder such as isocyanate or a crosslinking agent such as a polysaccharide.

The aliphatic polyester used in this invention can be manufactured by dehydrating and polycondensing one or more than one hydroxy-carboxylic acids or one or more than one aliphatic polybases (preferably aliphatic dicarboxylic acids) and/or their anhydrides, and one or more than one aliphatic polyhydroxy alcohol (preferably aliphatic diols).

Hydroxy-carboxylic acids used in this invention include glycolic acid, lactic acid, 3-hydroxybutyric acid, 4-hydroxybutyric acid, 4-hydroxyvaleric acid, 5-hydroxyvaleric acid, and 6-hydroxycaproic acid.

Aliphatic polybases and their anhydrides usable in this invention include aliphatic dicarboxylic acids such as oxalic acid, succinic acid, malonic acid, glutaric acid, adipic acid, pimelic acid, suberic acid, azelaic acid, sebacic acid, undecanoic acid and dodecanoic acid, and their anhydrides.

Aliphatic polyhydroxy alcohols usable in this invention include ethylene glycol, diethylene glycol, triethylene glycol, propylene glycol, dipropylene glycol, 1,3-butanediol, 1,4-butanediol, 3-methyl-1,5-pentanediol, 1,6-hyxanediol, 1,9-nonanediol, neopentyl glycol, tetramethylene glycol, and 1,4-cyclohexanedimethanol.

A crosslinking agent for aliphatic polyester may be e.g. a polysaccharide having functional groups. Such polysaccharides include cellulose, cellulose nitrate, cellulose acetate, methyl cellulose, ethyl cellulose, celluloid, viscous rayon, recycled rayon, cellophane, hemicellulose, starch, amylopectin, dextrin, dextran, glycogen, pectin, chitin, chitosan, gum arabic, cyamoposis gum, locust bean gum, or their derivative or mixture. Among them, acetyle cellulose and ethyl cellulose are especially preferrable.

The aliphatic polyester used in this invention can be manufactured in different ways. For example, it may be manufactured by directly hydrating and condensing lactic acid, a mixture of lactic acid and a non-lactic hydroxycarboxylic acid, or a mixture of an aliphatic diol and an aliphatic dicarboxylic acid in the presence of an organic solvent and a catalyst. Otherwise, it may be manufactured by indirect polymerization in which lactic acid or a mixture of lactic acid and a non-lactic hydroxy-carboxy is dehydrated to form a cylic dimer, and subjecting the dimer to ring opening polymerization.

The copolymer as the aliphatic polyester used in this invention shows different mechanical properties according to whether it is a random copolymer or a block copolymer. The content and molecular weight of each component of the resin composition according to this invention are not limited and should be adjusted according to the intended use.

The molecular weight of the aliphatic polyester used in this invention should be adjusted so that the resin composition shows suitable mechanical strength according to the intended use. But generally speaking, the aliphatic polyester has preferably a weight-average molecular weight of from 10000 one to five million. Below this range, the mechanical strength of the resin composition will be insufficient. Over this range, treatment will become difficult and moldability will deteriorate. Thus, most preferably, the molecular weight of the aliphatic polyester is 30000–3 million, 50000–1 million, 70000–500000 or 90000–300000.

The weight-average molecular weight of the aliphatic polyester and its molecular weight distribution are adjustable by varying the reaction conditions during polymerization such as the kind of solvent used, the kind and amount of catalyst used, reaction speed and time, and the degree of dehydration.

The lubricating oil used in this invention may be any oil which can disperse uniformly in the biodegradable synthetic resin as the main component, thus imparting required sliding properties to the resin composition according to the intended use. Specifically, such lubricating oils include synthetic oils such as fluorine oil, silicone oil, ester oil and poly- $\alpha$-olefin oil, mineral oils, animal and vegetable oils and liquid paraffin.

Among known lubricating oils, ester oils, animal and vegetable oils and polyalkylene glycol are especially preferable because they are all biodegradable.

The content of such a lubricating oil in the lubricative resin composition should be 3–30 volume %. If it is less than 3 volume %, the friction coefficient of the lubricative resin composition will decrease insufficiently so that sliding members made from such a resin composition are practically useless. If the content is over 30 volume %, the mechanical strength of the resin composition will drop, its biodegradability may be hampered, and its moldability will worsen.

The solid lubricant used in this invention may be any type which can disperse uniformly in the biodegradable synthetic resin as the main component, thus imparting required sliding properties to the resin composition according to the intended use. The solid lubricant is used in the form of fiber or powder. Specifically, such lubricants include mica, graphite, fluororesins such as tetrafluoroethylene resin, wollastonite, silica, calcium carbonate, clay (aluminum silicate), talc (magnesium silicate), aluminum hydroxide, aluminum sulfate, barium sulfate, calcium sulfate, cellulose powder, metallic soap, wax, bronze powder, kelmet powder, carbon fiber, molybdenum disulfide, tungsten disulfide, graphite fluoride, boron nitride, silicon nitride, and a mixture of two or more of them.

Among the above-listed solid lubricants, tetrafluoroethylene resin, graphite and mica are especially preferable because they are high in packing efficiency, and can lower the friction coefficient of the composition and increase its wear resistance.

The content of such a solid lubricant in the lubricative resin composition should be 5–30 volume %. If it is less than 5 volume %, the friction coefficient of the lubricative resin composition will decrease insufficiently so that sliding members made from such a resin composition are practically useless. If the content is over 30 volume %, the mechanical strength of the resin composition will drop, its biodegradability may be hampered, and its moldability will worsen. It is especially undesirable to add such a solid lubricant by more than 30% if it is a fluorine resin such as tetrafluoroethylene resin, because fluorine resins are not biodegradable and thus a greater part of the resin composition will remain undegraded in the soil.

Besides the above-listed essential components, the lubricative resin composition according to this invention may also contain additives such as an antioxidant, heat stabilizer, ultraviolet absorber, filler, antistatic agent, wetting agent, combustion promotor and pigment, or small amounts of other resins to improve various properties of the resin composition such as tensile strength, heat resistance, shock resistance and weather resistance.

The lubricative resin composition according to this invention may be manufactured by any known method. Typically, it is manufactured by the known mixing/molding method as used in the manufacture of a thermoplastic resin composition.

In this method, an aliphatic polyester, a lubricating oil and an optional third component are added at a predetermined ratio and uniformly mixed together by a high-speed or low-speed agitator. The mixture is then extrusion- or injection-molded by a single or multiple screw extruder in a molten and kneaded state into slide members such as slide bearings or gears.

[EXAMPLES]

The following are materials used in Examples of the invention and Comparative Examples. Their abbreviations are shown in brackets. The contents of these materials in the tables are all in volume percent.

(1) 7:3 (weight ratio) mixture of polylactic acid and polybutylene succinate [PLA ①]

(2) polylactic acid [PLA ②]

(3) copolymer of polylactic acid and polybutylene succinate [PLA ③] (4) 9:1 (weight ratio) mixture of polylactic acid and polycaprolactone [PLA ④]

(5) copolymer of polylactic acid and polycaprolactone [PLA ⑤]

(6) polyacetal [POM] made by Polyplastics Co.:M-90-02

(7) ester oil [E-OIL] made by NIPPON OIL & FATS Co.: UNISTER-H-381 (biodegradable)

(8) tetrafluoroethylene resin [PTFE] made by KITAMURA: KT400H (9) graphite [GRP] made by LONZA: KS10

(10) mica [MICA] made by NAKAKO Co.: FM-20

[Examples of the invention 1–14 and Comparative Examples 1 and 2]

The above-listed raw materials were added at the ratios shown in Tables 1 and 2, mixed together by a Henschel mixer and pelletized by a kneader/extruder. The pellets formed were dried for 10 hours at 60° C. and formed into test pieces by an injection molding machine. The test pieces were subjected to the following tests to determine their slidability and biodegradability. The results of the tests are shown in Tables 1 and 2.

1. Measurement of friction coefficient

To measure the friction coefficient, each test piece was brought into sliding contact with a bearing steel (SUJ2) at a sliding speed of 16 m/min. and a surface pressure of 3 kgf/cm² in room temperature with no lubrication by use of a thrust wear/friction tester.

2. Biodegradability in soil

The test pieces were buried in soil having a water content of 30% and kept at 35° C. After six months, their appearances were observed and the weight change of each test piece before and after the test (i.e. residue rate in % relative to the weight at start of test) was measured.

As will be apparent from Tables 1 and 2, Comparative Example 1, which contains no lubricating oil, was poor in slidability, though biodegradable in soil. Comparative Example 2, which contains self-lubricative POM, had little biodegradability, though its lubricity was sufficiently high.

In contrast, Examples 1–14 of the invention, which satisfy all the conditions required according to the present invention, suffered no damage while in sliding contact with the mating member, showed excellent slide characteristics with a low friction coefficient and minimum wear. After the biodegradability test, they had been biodegraded to such an extent that it was impossible to take them out of soil to observe their outer appearances because simply by lightly touching them with fingers, they crumbled to pieces.

When this resin composition according to the present invention is used as a material for slide parts, it will show a low friction coefficient stably, excellent wear resistance and biodegradability.

Sliding parts such as slide bearings and gears made from this resin composition will show a low friction coefficient stably, excellent wear resistance and biodegradability.

TABLE 1

| | Example | | | | | | |
|---|---|---|---|---|---|---|---|
| | 1 | 2 | 3 | 4 | 5 | 6 | 7 |
| Content in vol % (wt % in bracket) | | | | | | | |
| PLA ① | 95 (96) | 90 (92) | 85 (88) | — | — | — | — |
| PLA ② | — | — | — | 90 (92) | — | — | — |
| PLA ③ | — | — | — | — | 90 (92) | — | — |
| PLA ④ | — | — | — | — | — | 90 (92) | — |
| PLA ⑤ | — | — | — | — | — | — | 90 (92) |
| POM ⑥ | — | — | — | — | — | — | — |
| E-OIL ⑦ | 5 (4) | 10 (8) | 15 (12) | 10 (8) | 10 (8) | 10 (8) | 10 (8) |
| Specific wear (*) | 600 | 300 | 70 | 450 | 370 | 440 | 420 |
| Friction coefficient | 0.2 | 0.2 | 0.2 | 0.2 | 0.2 | 0.2 | 0.2 |
| Biodegradability (appearance‡) | ○ | ○ | ○ | ○ | ○ | ○ | ○ |
| Residue rate (wt %) | 3 | 6 | 8 | 5 | 5 | 4 | 7 |

(*) × 10⁻¹⁰ cm³/(kg · m)

(Appearance‡)

○—easily collapsed

X—no change

TABLE 2

| | Example | | | | | | | Comparative Example | |
|---|---|---|---|---|---|---|---|---|---|
| | 8 | 9 | 10 | 11 | 12 | 13 | 14 | 1 | 2 |
| Content in vol % (wt % in bracket) | | | | | | | | | |
| PLA ② | 90 (83) | 90 (83) | 90 (79) | — | — | — | — | 100 (100) | — |
| PLA ① | — | — | — | 90 (83) | — | — | — | — | — |
| PLA ③ | — | — | — | — | 90 (83) | — | — | — | — |
| PLA ④ | — | — | — | — | — | 90 (83) | — | — | — |
| PLA ⑤ | — | — | — | — | — | — | 90 (83) | — | — |
| POM ⑥ | — | — | — | — | — | — | — | — | 100 (100) |
| PTFE ⑧ | 10 (17) | — | — | 10 (17) | 10 (17) | 10 (17) | 10 (17) | — | — |
| GRP ⑨ | — | 10 (17) | — | — | — | — | — | — | — |
| MICA ⑩ | — | — | 10 (21) | — | — | — | — | — | — |

TABLE 2-continued

| | Example | | | | | | | Comparative Example | |
|---|---|---|---|---|---|---|---|---|---|
| | 8 | 9 | 10 | 11 | 12 | 13 | 14 | 1 | 2 |
| Specific wear (*) | 1500 | 300 | 350 | 176 | 210 | 190 | 200 | $10^4$ | $10^3$ |
| Friction coefficient | 0.2 | 0.3 | 0.3 | 0.2 | 0.2 | 0.2 | 0.2 | 0.6 | 0.4 |
| Biodegradability (appearance‡) | ○ | ○ | ○ | ○ | ○ | ○ | ○ | ○ | X |
| Residue rate (wt. %) | 22 | 20 | 24 | 21 | 22 | 21 | 21 | 5 | 100 |

(*) × $10^{-10}$ cm$^3$/(kg · m)
(Appearance‡)
○—easily collapsed,
X—no change

What is claimed is:

1. A biodegradable lubricative resin composition comprising (1) an aliphatic polyester having a weight-average molecular weight of from 10000 to 5 million which is a monopolymer or a copolymer of a hydroxy-carboxylic acid or an aliphatic polyhydroxy alcohol and an aliphatic polybase, or a mixture thereof, and (2) a lubricant.

2. A resin composition as claimed in claim 1 wherein said lubricant is a lubricating oil.

3. A resin composition as claimed in claim 2 wherein the content of said lubricating oil is 3–30 volume percent.

4. A resin composition as claimed in claim 2 wherein said lubricating oil is a biodegradable lubricating oil.

5. A resin composition as claimed in claim 4 wherein the content of said lubricating oil is 3–30 volume percent.

6. A resin composition as claimed in claim 1 wherein said lubricant is a solid lubricant.

7. A resin composition as claimed in claim 6 wherein the content of said solid lubricant is 5–30 volume percent.

8. A resin composition as claimed in claim 6 wherein said solid lubricant is at least one number selected from the group consisting of tetrafluoroethylene resin, graphite and mica.

9. A resin composition as claimed in claim 8 wherein the content of said solid lubricant is 5–30 volume percent.

10. A slide bearing molded from the resin composition claimed in claim 1.

11. A gear molded from the resin composition claimed in claim 1.

12. A resin composition as claimed in any of claims 1–9 wherein said aliphatic polyester is polylactic acid, a copolymer of lactic acid and a hydroxy-carboxylic acid other than lactic acid, a copolymer of lactic acid or an aliphatic polyhydroxy alcohol and an aliphatic polybase, a mixture of polylactic acid and a polymer of a hydroxy-carboxylic acid other than lactic acid, or a mixture of polylactic acid and a polymer of an aliphatic polyhydroxy alcohol and an aliphatic polybase.

13. A resin composition as claimed in claim 12 wherein said aliphatic polyester contains 50–100% by weight of lactic acid.

* * * * *